March 7, 1933.  M. G. KENYON ET AL  1,900,820
SHIPPING CONTAINER
Filed July 24, 1931
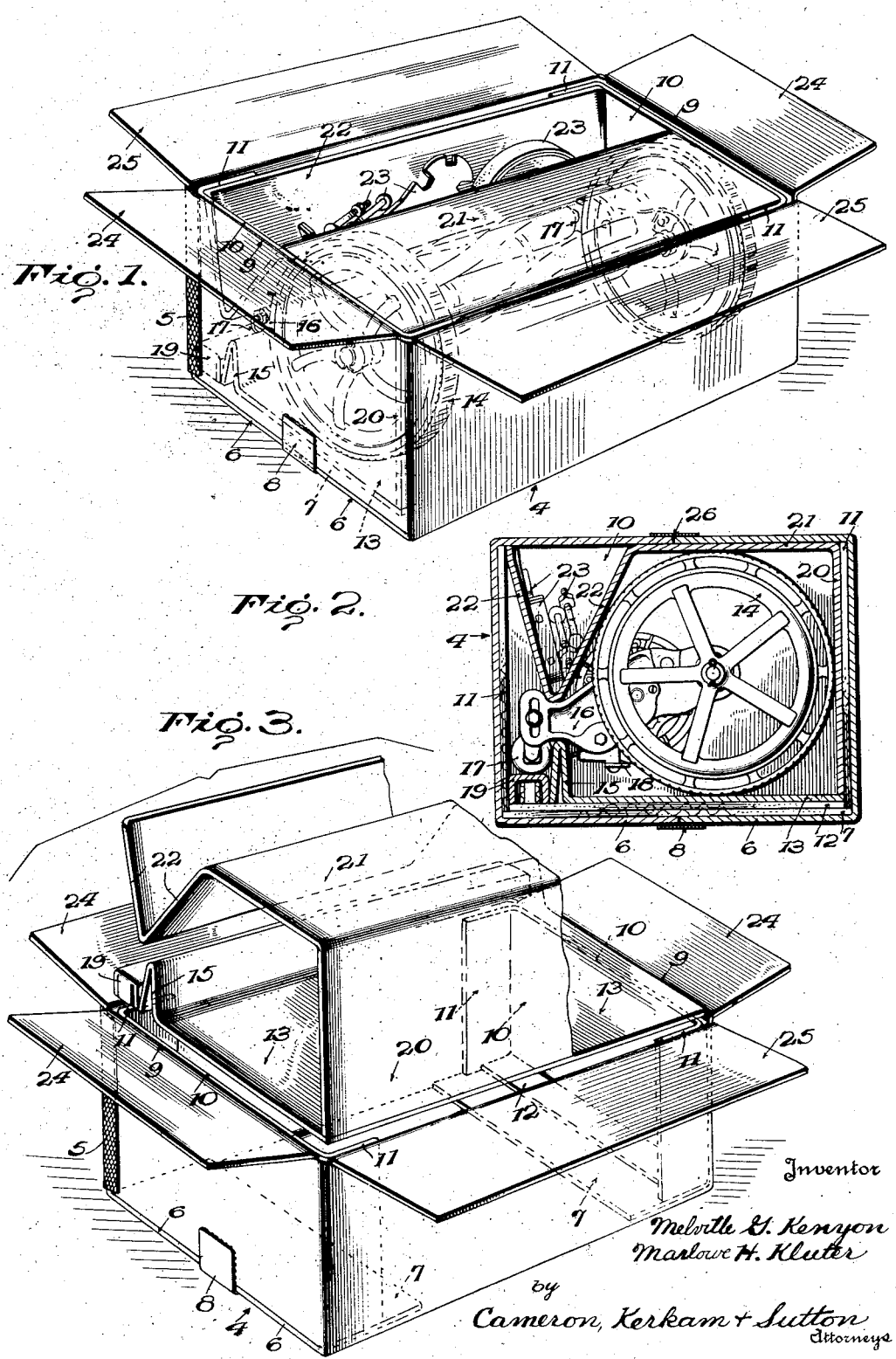

Patented Mar. 7, 1933

1,900,820

UNITED STATES PATENT OFFICE

MELVILLE G. KENYON AND MARLOWE H. KLUTER, OF RICHMOND, INDIANA, ASSIGNORS TO THE F. & N. LAWN MOWER COMPANY, OF RICHMOND, INDIANA, A CORPORATION OF DELAWARE

SHIPPING CONTAINER

Application filed July 24, 1931. Serial No. 552,950.

This invention relates to shipping containers, and more particularly to boxes for shipping objects such as lawn mowers.

Due to the comparatively heavy weight of a lawn mower and the fact that the surfaces upon which a mower rests are free to rotate, great difficulty has hitherto been experienced in providing a satisfactory, compact and economical shipping container for a mower which would insure safe transportation of the mower, and also provide stowage space without waste for the smaller detachable parts of the mower and protect them against breakage.

It has accordingly been the practice either to ship lawn mowers completely assembled without any special protection to the parts, or to employ comparatively heavy and expensive wooden boxes or crates for the mowing parts, shipping the handles separately. It has also been attempted to ship lawn mowers in ordinary paper-board cartons without any special packing protection, but due to the resiliency of the thin walls of such a container, certain parts of the mower, such as the cutter bar and knives, are apt to be thrown out of adjustment, and other parts broken. Also, as above intimated, the mower has a tendency to roll within the carton and to break through the walls at various points. All of these methods are therefore undesirable from safety and economy standpoints, and numerous efforts have been made to develop an inexpensive, light container, as of corrugated or fibre board, which will fulfill all requirements of safe and economical transportation.

It is therefore one of the objects of the present invention to provide a novel shipping container for a lawn mower which is light in weight and inexpensive of manufacture, and yet will safely transport a mower without danger of damage to any of its parts.

Another object is to provide a box for shipping a lawn mower which includes a novel arrangement of interior packing for effectively anchoring the mower against movement with in the box during shipment.

A further object is to provide a shipping box for a lawn mower embodying novel interior packing or partition members which not only properly protect the heavy parts of the mower during shipment, but also provide adequate stowage space without waste for the smaller detachable parts of the mower.

These and other objects will appear more fully from a consideration of the detailed description of the invention which follows. Although only one embodiment of the invention is described and illustrated in the accompanying drawing, it is to be expressly understood that this drawing is for the purpose of illustration only and is not to be construed as a limitation of the scope of the invention, reference being had for this purpose to the appended claims.

In the drawing:

Fig. 1 is a perspective view of an open container with a lawn mower packed for shipment therein illustrating one embodiment of the present invention;

Fig. 2 is a sectional view of the container shown in Fig. 1 when completely sealed; and Fig. 3 is a perspective view of the open shipping container with the various portions of the interior packing shown in drawn-out position indicating the manner in which it is nested in the container.

Referring now to the drawing, wherein like reference characters indicate like parts throughout the several views, there is disclosed therein a shipping container or box for a lawn mower embodying novel interior packing or partition members which not only reenforce the container and effectively anchor the mower against movement therewithin during shipment, but also provide adequate stowage space without waste for the smaller detachable parts of the mower and protect them against possible injury by contact with the larger heavier portion. In the form shown, an outer container or box, indicated generally at 4, which may be of any desired construction but is preferably formed of light, inexpensive material, such as corrugated strawboard or fibre board, is adapted to receive an object such as a lawn mower together with a novel arrangement of interior packing or partition members for securing and protecting the mower parts during shipment. Outer box 4 may be formed in the well known manner from a single blank of suitable material scored along appropriate lines so that the blank may be bent into shape to form the box, the two edges of the blank being secured together by a suitable binding member 5 to form one corner of the box, and the end and side flaps 6 and 7 of the bottom being folded and suitably secured to one another as by glue, the seam being reenforced by a suitable binding strip 8.

Although a box such as that just described, particularly when made of a corrugated material, has sufficient strength to carry an object of the weight of a lawn mower, it is preferable, because of the wheel and roller construction of such articles, to provide additional reenforcing members within the box and to as far as practicable anchor the mower against movement within the outer box during shipment. Outer box 4 is therefore provided with a pair of end reenforcing members 9, which, along with the other interior packing members, may be of the same corrugated material as the outer box, each of which comprises a vertical section 10 of substantially the same size as the end of outer box 4, a pair of vertical side flaps 11 and a bottom horizontal flap 12, all formed from a single integral blank suitably scored along the bending edges. One of these reenforcing members 9 is placed inside of and fitted snugly against each end of outer box 4.

Resting on top of bottom horizontal flaps 12 of end reenforcing members 9 are the bottom supporting and anchoring members of the interior packing. As shown, a bottom member 13, rectangular in shape and covering in excess of half of the bottom of the box, supports the drive or ground wheels 14 of the mower. One of the longitudinal edges of bottom member 13 abuts side flaps 11 of the end reenforcing members 9 adjacent one side of outer box 4, while the opposite edge is located intermediate the center line of the box and the opposite side, and has adjacent thereto, and preferably formed integrally therewith, an inverted V anchoring member 15 which projects upwardly from the bottom of the box with its vertex abutting the frame 16 of the mower between the roller 17 and the cutter bar 18. Roller 17 is in turn supported by a supporting member 19 which, as shown, is substantially U-shaped in cross section and occupies the space between inverted V anchoring member 15 and the other side of the outer box. By thus supporting roller 17 above the bottom of the box and wedging the vertex of inverted V anchoring member 15 against the underside of frame 16 between roller 17 and cutter bar 18, the mower is effectively anchored against movement within the box.

In order to further reenforce the sides and top of outer box 4 and prevent movement of frame 16 and its attached parts including roller 17 and cutter bar 18 should the box be turned over during shipment, a novel one-piece partition member is provided having a vertical section 20, a top section 21 and a pair of oblique sections 22, all formed from a single blank suitably scored at the bending edges. Vertical section 20 is adapted to fit between side flaps 11 of end reenforcing members 9 and drive wheels 14 of the mower, the latter being in engagement with said vertical section. Top section 21 then rests on top of drive wheels 14, and oblique sections 22 form a V-shaped pocket having its vertex resting on frame 16 of the mower substantially directly above the vertex of inverted V anchoring portion 15 of the bottom member. The free edge of oblique member 22 adjacent the side of outer box 4 rests against and on a level with the top of side flaps 11 of end reenforcing members 9, while the other oblique section is tangent to and in contact with the peripheries of driving wheels 14. The pocket thus formed provides an adequate and safe stowage space without waste for the smaller detachable parts 23 of the mower, such as the handle irons, bolts, and wrench, it being understood that the handle of the mower is shipped separately.

In packing a lawn mower for shipment in the novel container thus described, end reenforcing members 9 are first inserted with the vertical sections 10, side flaps 11 and bottom flaps 12 fitting closely against the ends, sides and bottom of outer box 4, which has previously been formed in the usual manner with the end and side flaps of the top open. Bottom member 13, inverted V anchoring member 15 and supporting member 19 are then placed in the bottom of the outer box with their ends resting on bottom flaps 12 of end reenforcing members 9. The comparatively heavy mowing assembly of the lawn mower is then placed in the box, drive wheels 14 resting on bottom supporting member 13 and roller 17 resting on supporting member 19, with the vertex of inverted V anchoring member 15 abutting the bottom of frame 16 and projecting between roller 17 and cutter bar 18. The top partition member is then placed over the mower with vertical section 20 passing between driving wheels 14 and one side of the outer box, top section 21 resting on top of drive wheels 14 and oblique sections 22 forming a V-shaped pocket with its vertex resting on top of frame 16 substantially directly above the vertex of anchoring member 15, the free edge of the pocket abutting side flaps 11 adjacent the other side of outer box 4. In this position, the inner oblique section 22 is tangent to and rests against the peripheries of driving wheels 14. After the smaller detachable parts 23 of the mower have been stowed in the V-shaped pocket thus formed, the end flaps 24 of the top are folded in and then the side flaps 25, the latter being suitably glued on their bottom surfaces so as to adhere securely to the end flaps 24. The seam may then be covered by a suitable reenforcing strip 26, and the box is ready for shipment.

There is thus provided by the present invention a novel shipping container or box for an object such as a lawn mower which, although built from light, inexpensive material, is nevertheless sufficiently strengthened by novel interior packing and partition members to insure safe transportation of the mower, including the smaller detachable parts thereof. The novel interior packing arrangement provided not only reenforces the outer box or container but also effectively prevents movement of the mower within the box during shipment, and further provides adequate stowage space without waste for various smaller detachable parts of the mower and protects them from injury during transportation. Due to this novel and efficient packing arrangement, it is now possible to ship lawn mowers in light, inexpensive containers, as of corrugated strawboard and the like, and thereby effect substantial savings in freight and packing costs, at the same time increasing the safety of the mower against breakage and disturbed adjustment or alignment as compared with methods now generally used.

It will be obvious that the invention is not limited to the form shown in the drawing, but is capable of a variety of mechanical embodiments. For example, supporting member 19 which supports roller 17 of the mower may, if desired, be formed from the same integral piece of material as that from which inverted V anchoring portion 15 and bottom supporting member 13 are formed, or all three of these pieces may be formed separately. Also, the top partition member may be made continuous with bottom member 13, thus making it possible that the entire interior packing may be formed from one integral piece of corrugated board appropriately scored at the bending edges. Further, it will be understood that the invention is not limited to containers and packing members for lawn mowers or to those made of corrugated strawboard and the like, but that the same packing arrangement may be used for other objects and that any suitable material may be employed for both the outer box and the inner packing members. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a shipping container for a lawn mower, an arrangement of interior packing comprising a bottom member upon which the drive wheels of the mower are adapted to rest, said member having an upwardly projecting inverted V portion adapted to extend between the roller and the cutter bar of the mower, a supporting member of inverted U shape upon which said roller is adapted to be supported, said supporting member being adjacent to and extending substantially the length of said inverted V portion on the side thereof opposite said bottom member, and a partition member having a vertical section passing between one side of the container and the drive wheels of the mower, a top section resting on said drive wheels, and a pair of oblique sections forming a V-shaped pocket to receive small detachable parts of the mower, one of said oblique sections being in contact with said driving wheels, and the vertex of said pocket resting on the frame of the mower substantially directly above the vertex of the inverted V portion of the bottom member.

2. In a shipping container for a lawn mower, an arrangement of interior packing to prevent movement of the mower within the container including a bottom member upon which the drive wheels of the mower are adapted to rest, an upwardly projecting inverted V portion formed integrally with said bottom member and adapted to extend between the roller and the cutter bar of the mower, and a supporting member of inverted U shape upon which said roller is adapted to be supported, said supporting member being adjacent to and extending substantially the length of said inverted V portion on the side thereof opposite to said bottom member.

3. A package comprising an outer box, a lawn mower within said box, and an interior packing member having a vertical section passing between one side of the container and the drive wheels of the mower, a top section resting on said driving wheels, and a pair of oblique sections forming a V-shaped pocket to receive small detachable parts of the mower, one of said oblique sections being in contact with the peripheries of said driving wheels and the vertex of said pocket resting on the frame of the mower.

4. A package comprising an outer box, a pair of interior end reenforcing members each comprising a vertical section of substantially the same size as and fitting closely against one end of said outer box, a pair of vertical side flaps and a bottom horizontal flap, a lawn mower within said box, an interior bottom member upon which the drive wheels of the mower rest including an upwardly projecting inverted V portion extending between the roller and the cutter bar of the mower, a supporting member of inverted U shape interposed between said inverted V portion and the adjacent end of said outer box and upon which said roller is supported, said bottom and supporting members resting on top of said bottom horizontal flaps of the end reenforcing members, and a partition member having a vertical section passing between one side of the outer box and the drive wheels of the mower, a top section resting on said drive wheels, and a pair of oblique sections forming a V-shaped pocket to receive small detachable parts of the mower, one of said oblique sections being in contact with said driving wheels and the vertex of said pocket resting on the frame of the mower substantially directly above the vertex of the inverted V portion of the bottom member.

5. A package comprising an outer box, a lawn mower within said box, an inner bottom member for preventing movement of the mower within the outer box including an upwardly projecting inverted V anchoring portion, the vertex of which extends between the roller and the cutter bar of the mower, a supporting member upon which said roller is supported extending substantially the length of said inverted V anchoring portion and interposed between said portion and the adjacent side of said outer box, and an inner partition member covering the top of the mower and including a pair of oblique sections forming a V-shaped pocket to receive small detachable parts of the mower, the vertex of said pocket resting on the frame of the mower substantially directly above the vertex of the inverted V portion of the inner bottom member.

6. A shipping container for a lawn mower comprising an outer box, a substantially rectangular inner bottom reenforcing member upon which the drive wheels of the mower are adapted to rest and extending from one side of said outer box to a line intermediate the center line and the opposite side thereof, an upwardly projecting inverted V portion adjacent said bottom member at its inner edge, the vertex of said V portion being adapted to extend between the roller and the cutter bar of said mower, a supporting member of inverted U-shape interposed between said upwardly projecting inverted V portion and said opposite side of the outer box and adapted to support said roller, and a partition member having a vertical section adapted to pass between the drive wheels of the mower and one side of the outer box, a top section substantially level with the top of said box and adapted to rest on said drive wheels and a pair of oblique sections forming a V-shaped pocket with its vertex extending downwardly into said box and adapted to rest on the frame of said mower, the edge of said pocket abutting the side of said box opposite to said vertical section.

7. A package comprising an outer box, a lawn mower within said box, an arrangement of interior packing for preventing movement of said mower within said box including a bottom member upon which the drive wheels of the mower rest, an upwardly projecting inverted V anchoring member formed integrally with said bottom member and extending between the roller and the cutter bar of the mower, and a partition member including a pair of oblique sections forming a V-shaped pocket to receive small detachable parts of the mower, the vertex of said pocket resting on the frame of the mower and the edges of said oblique sections engaging and cooperating with the top and sides of the outer box to anchor the mower against movement therewithin.

8. A package comprising an outer box, a lawn mower within said box, and an arrangement of interior packing for preventing movement of the mower within the box including a V-shaped member projecting downwardly into said box, the vertex of said member resting upon the frame of the mower, and a horizontal member formed integrally with one of the oblique sections of said V-shaped member and resting on top of said driving wheels and engaged between the latter and the top of the box, the upper edge of the other of said oblique sections engaging the upper inner edge of the box between the top and sides thereof, and the space between said oblique sections forming a pocket for small detachable parts of the mower.

9. A package comprising an outer box of relatively light, corrugated board, a lawn mower within said box, and an arrangement of interior packing covering the upper surfaces of the mower after it has been placed in the box including a multi-section partition member of substantially the same material as said box extending downwardly into the box and engaging both the frame and driving wheels of the mower, said member cooperating with the top and sides of the outer box to anchor the mower against movement therewithin, and the space formed between said member and the top of the box forming a pocket for housing small detachable parts of the mower and preventing contact thereof with the heavier parts of the mower during shipment.

10. A package comprising an outer box of relatively light, corrugated board, a lawn mower within said box, and an arrangement of interior packing covering the upper surfaces of the mower after it has been placed in the box including a substantially V-shaped partition member of substantially the same material as said box extending downwardly into the box and engaging both the frame and driving wheels of the mower, said member cooperating with the top and sides of the outer box to anchor the mower against movement therewithin, and the space formed between said member and the top of the box forming a pocket for housing small detachable parts of the mower and preventing contact thereof with the heavier parts of the mower during shipment.

11. A package comprising an outer box of relatively light, fibrous material, a lawn mower within said box, and an arrangement of interior packing covering the upper surfaces of the mower after it has been placed in the box including a partition member of substantially the same material as said box having a vertical section passing downwardly between the mower and one side of the outer box, a horizontal section resting on top of the uppermost surface of said mower and adapted to be engaged between the latter and the top of the box when the top is closed, a section extending downwardly into the box and resting upon the mower, and an additional section extending upwardly from the mower to the top of the box, said sections cooperating with the top and sides of the outer box to anchor the mower against movement therewithin, and the space formed between said two last named sections and the top of the box forming a pocket for housing small detachable parts of the mower and preventing contact thereof with the heavier parts of the mower during shipment.

12. A package comprising an outer box of relatively light, fibrous material, a lawn mower within said box, and an arrangement of interior packing covering the upper surfaces of the mower after it has been placed in the box including a partition member formed from an integral piece of substantially the same material as said box and having a vertical section passing downwardly between the mower and one side of said outer box, a horizontal section resting on top of the uppermost surface of said mower and adapted to be engaged between the latter and the top of the box when the top is closed, and a substantially V-shaped section extending downwardly into the box and resting upon the mower, said sections cooperating with the top and sides of the outer box to anchor the mower against movement therewithin, and the space formed between said last named section and the top of the box forming a pocket for housing small detachable parts of the mower and preventing contact thereof with the heavier parts of the mower during shipment.

In testimony whereof we have signed this specification.

MELVILLE G. KENYON.
MARLOWE H. KLUTER.